US006778665B1

(12) United States Patent
Fischer et al.

(10) Patent No.: US 6,778,665 B1
(45) Date of Patent: Aug. 17, 2004

(54) DISTRIBUTION OF CURRENT DRAW IN A LINE POWERED DAA

(75) Inventors: Jonathan H. Fischer, Blandon, PA (US); Donald R. Laturell, Allentown, PA (US); Lane A. Smith, Easton, PA (US); Michael S. Toth, Allentown, PA (US); Michael G. Williams, Allentown, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/414,565

(22) Filed: Oct. 8, 1999

(51) Int. Cl.[7] .......................... H04M 1/00; H04M 9/00; H04M 11/00
(52) U.S. Cl. ............... 379/413; 379/93.36; 379/395.01; 379/399.01; 379/399.02; 379/413
(58) Field of Search ................................ 379/377, 380, 379/387.01, 390.04, 395.01, 399.01, 399.02, 402, 413, 413.02, 93.28, 93.36

(56) References Cited

U.S. PATENT DOCUMENTS

| | | | | | |
|---|---|---|---|---|---|
| 4,373,117 | A | * | 2/1983 | Pierce ...................... | 379/93.36 |
| 4,395,590 | A | * | 7/1983 | Pierce et al. ............. | 379/93.36 |
| 4,578,533 | A | * | 3/1986 | Pierce ...................... | 379/93.31 |
| 4,803,719 | A | * | 2/1989 | Ulrich .................... | 379/399.01 |
| 5,086,454 | A | * | 2/1992 | Hirzel ..................... | 379/93.36 |
| 5,224,154 | A | * | 6/1993 | Aldridge et al. ......... | 379/93.36 |
| 5,655,010 | A | * | 8/1997 | Bingel ..................... | 379/93.28 |
| 5,786,921 | A | * | 7/1998 | Wang et al. ............... | 398/128 |
| 5,790,653 | A | * | 8/1998 | Fairbanks et al. ......... | 379/372 |
| 6,198,944 | B1 | * | 3/2001 | Hollenbach et al. ........ | 455/557 |
| 6,212,226 | B1 | * | 4/2001 | Newton ...................... | 375/222 |
| 6,212,274 | B1 | * | 4/2001 | Ninh ......................... | 379/413 |
| 6,226,331 | B1 | * | 5/2001 | Gambuzza .................. | 375/258 |
| 6,230,970 | B1 | * | 5/2001 | Walsh et al. ............... | 235/379 |
| 6,359,973 | B1 | * | 3/2002 | Rahamim et al. ........ | 379/93.05 |
| 6,377,667 | B1 | * | 4/2002 | Poulis et al. ............. | 379/93.36 |
| 6,421,430 | B1 | * | 7/2002 | Hollenbach et al. ..... | 379/93.36 |
| 6,674,857 | B1 | * | 1/2004 | Fischer et al. ............. | 379/413 |
| 6,687,371 | B1 | * | 2/2004 | Fischer et al. ......... | 379/399.02 |

* cited by examiner

Primary Examiner—Binh Tieu

(57) ABSTRACT

A line powered data access arrangement (DAA) is disclosed which adaptively allows proper operation with power supplied from a telephone line as conditions warrant, while at the same time satisfying the relevant requirements of many countries. In the line powered codec, a startup procedure for the international line powered codec uses register settings, e.g., country-specific register settings, which are powered and maintained from the low voltage side (e.g., from the PC or modem side) of the line powered codec. In this way, even during low line power conditions the programmed state of the line powered codec can be maintained, thus a default condition will not necessarily returned to by the line powered codec upon reset due to a power loss in the telephone line. In another aspect, a charge storage device such as a charge capacitor is charged from a charge pump formed from a differential clock signal from the low voltage side. A current and voltage detection module in the line powered codec is always powered from the telephone line. Upon detection of an off-hook signal or a power down condition, the current detection module determines if/when the current and voltage on the telephone line is sufficient to power certain circuits on the line powered codec. If sufficient power is not present, the line powered codec does not power up. However, the line powered codec will power up if sufficient current is detected. In another aspect, a plurality of power rails may be provided. A first power rail may be associated with the line power, a second power rail may be associated with a low voltage side power source, e.g., a charge storage device. A third (and other) power rails may be switchably connected to either the first power rail or second power rail as line power conditions and on-hook/off-hook conditions warrant.

20 Claims, 6 Drawing Sheets

FIG. 3
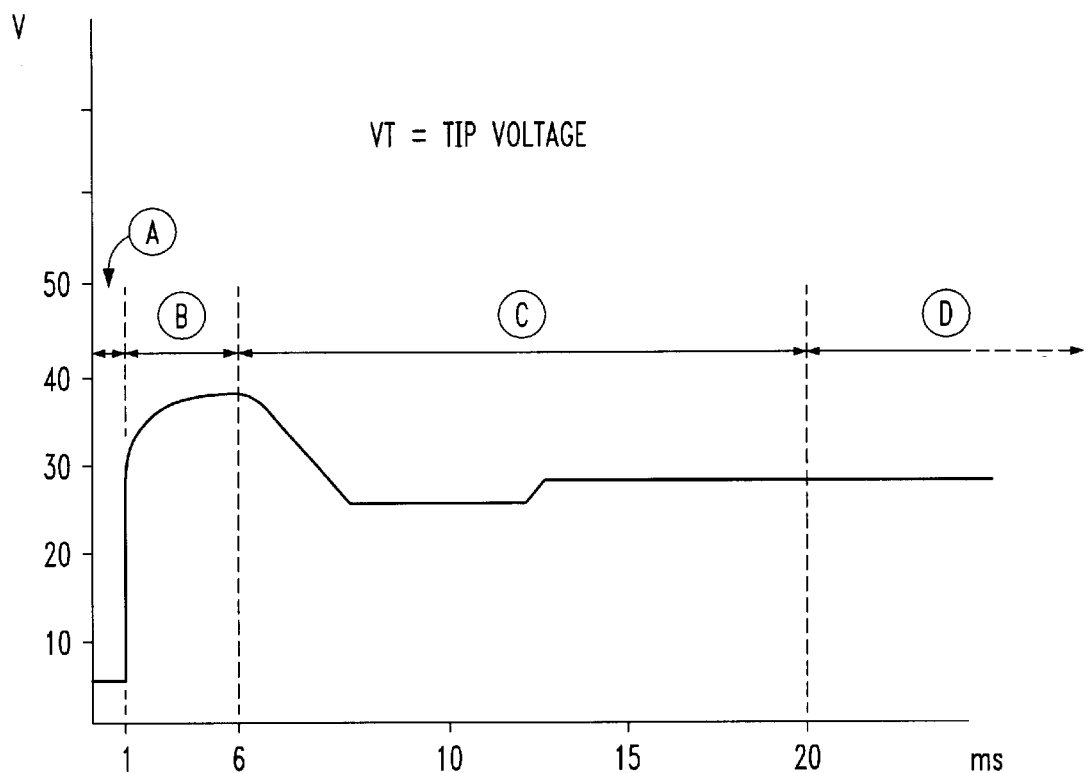
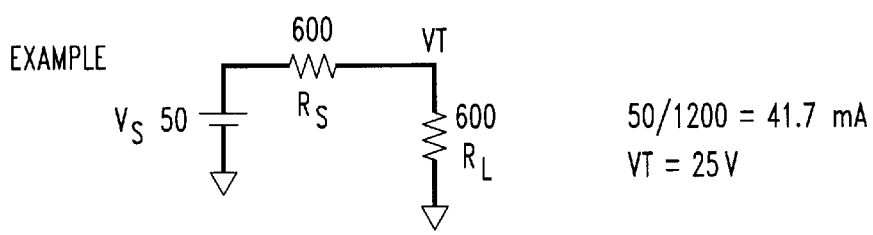
EXAMPLE
$50/1200 = 41.7$ mA
$V_T = 25$ V

CALL BRIDGE TIMING DIAGRAM

LOW CURRENT STARTUP TIMING DIAGRAM

DISTRIBUTION OF CURRENT DRAW IN A LINE POWERED DAA

BACKGROUND OF THE INVENTION

1. Field of the Invention

This invention relates to a line interface for data access arrangements (DAA). More particularly, it relates to an adaptive line powered codec.

2. Background of Related Art

Many portable computer devices utilize modems and other data devices for communicating over a telephone line. In such devices, battery size and weight is an important consideration. A balance must be reached between the size and weight of the overall device, which is dictated largely by the choice of battery, and an acceptable length of operation between charges.

Unfortunately, although operating an acceptable length of time when running typical application programs, the modems and other data communication devices of a portable computer utilize a large amount of power when communicating over a telephone line. The battery source which powers both the portable computer device and its modem is typically sized for general computing applications, and runs out of power quickly when actively communicating over a telephone line through a modem. Portable computer devices such as personal digital assistants (PDAs), hand held PCs (HPC), PCMCIA modems, and portable data terminals are designed to operate up to several hours on a single battery charge, but operate only fractions of an hour on a single battery charge when communicating via modem. Thus, although portable computer devices operate a sufficient length of time for quick data transfers over a modem powered completely by a battery, they typically require that external AC power be applied to allow for longer uses of the modem. It is therefore desirable for battery powered computer devices including a modem to draw power, in addition to the inherent battery, from a secondary power source.

The DC power inherent in a telephone line provides a convenient source of power, but there are often limitations and restrictions which limit the ability of a modem to derive power from the telephone line. For instance, present regulations in the United States are such that significant current may only be drawn from the telephone line when the telephone or modem is in an off-hook or active condition. In order to hold the telephone line in an off-hook condition, current in the approximate range of 13 milliamps (mA) to 150 mA must be drawn. Thus, the maximum amount of current drawn from the telephone line is limited.

Modems which are designed to be powered entirely from the telephone line are known, but these designs either suffer from an extremely constrained power budget, or are wasteful of the available current. Moreover, modems in general are also subject to government constraints, e.g., FCC Part 68 requirements for telephones in the U.S., and limitations on effects and noise which may be placed back on the telephone line, placing further restrictions on the use of power from the telephone line.

An exemplary line powered modem is described in U.S. application Ser. No. 09/028,061, entitled "Low Noise Line Powered DAA With Feedback" by Hollenbach et al., filed Feb. 23, 1998, the entirety of which is explicitly incorporated herein by reference.

A Data Access Arrangement (DAA) provides the physical interface between a data source such as a modem, and a telephone line. The DAA is responsible for presenting the proper DC termination and AC modulation characteristics to the telephone line. For instance, the DAA must draw a minimum amount of DC current when in the off-hook condition to hold the telephone line in an off-hook condition, but at the same time must draw no more than a maximum amount of current while in the off-hook condition. Thus, the DC termination or load must be within prescribed limits corresponding to the pertinent telephone standards of the country in which the DAA is being used. Accordingly, the modem must operate with no more than the prescribed maximum current available from a telephone line in the particular country in which the DAA is being used.

In today's global economy, it is desirable to design and manufacture products for use in any of a plurality of different countries, not just for a single country. However, the regulations with respect to the minimum and maximum amount of current the customer premises equipment must draw (i.e., the DC load) to meet the off-hook specifications varies greatly in different countries. Thus, a DAA used in one country must provide characteristics to a telephone line which may be and often are entirely different from the characteristics presented by a DAA used in another country. Accordingly, manufacturers conventionally manufacture different DAAs including different physical components for each of the varying countries, or manufacture a DAA with termination components which are switched in and out based on the requirements of the particular country in which the device is used. Manufacture of separate DAAs for separate countries, and/or the manufacture of DAAs having switchable components for use in various countries, increases the overall costs of providing such DAAs in a global marketplace. Moreover, the reliability may be degraded due to the higher parts count.

There is a need for a cost effective and reliable DAA capable of being powered at least in part by the available line current presented by the various countries.

SUMMARY OF THE INVENTION

In accordance with the principles of the present invention, a line powered codec comprises a high current portion comprising components to be powered from a telephone line connected to the line powered codec. A first power rail in the high current portion is adapted to be powered from a telephone line connected to the line powered codec. A low current portion comprising components to be powered from an external power source is on a low voltage side of the line powered codec. A second power rail in the low current portion is adapted to be powered from the external power source.

A method of switching a power source for at least one component in a line powered codec in accordance with another aspect of the present invention comprises detecting a level of available power from a telephone line. If sufficient power is available from the telephone line, at least one component to be powered from the telephone line is switched to receive power from the telephone line.

BRIEF DESCRIPTION OF THE DRAWINGS

Features and advantages of the present invention will become apparent to those skilled in the art from the following description with reference to the drawings, in which:

FIG. 3 shows the resulting line voltage after the system of FIG. 1 goes off-hook, in accordance with the principles of the present invention.

DETAILED DESCRIPTION OF ILLUSTRATIVE EMBODIMENTS

Figure 1:
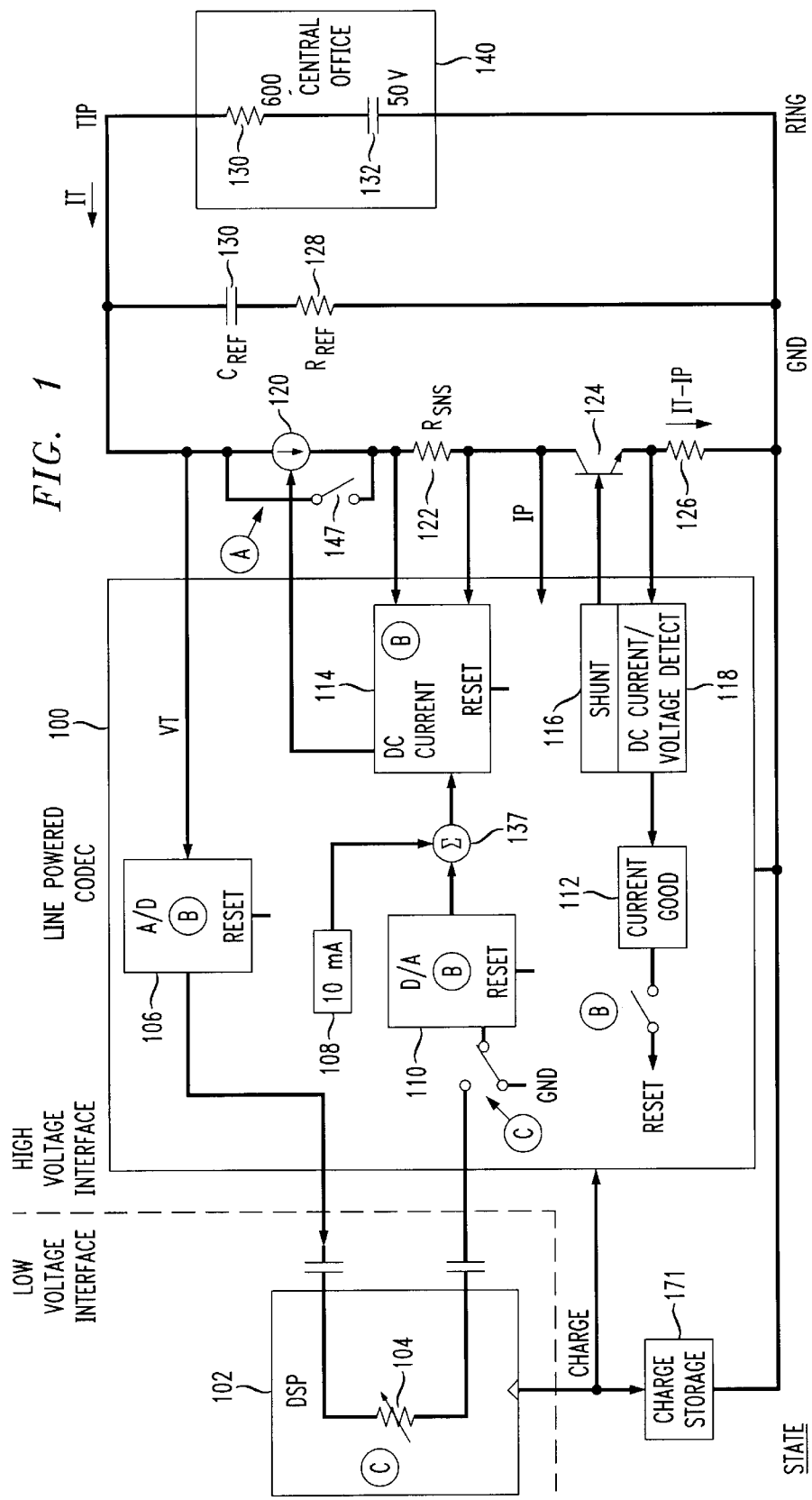
FIG. 1 shows a simplified example system topology for a line powered codes with extended DC feedback control in accordance with the principles of the present invention.

A codec for a data access arrangement (DAA) is disclosed which adaptively allows proper operation with power supplied from a telephone line as conditions warrant, while at the same time satisfying the relevant requirements of many countries.

In particular, a codec is disclosed which is capable of being powered partially and adaptively from telephone line current, as conditions warrant. Conventionally, several problems associated with line powered codecs have limited or prevented the development of a codec which is partially powered by telephone line current. For instance, different regulations in various countries allow the current and/or voltage to disappear from the telephone line for short periods of time, interrupting the, source of power to a line powered codec. Thus, a line powered codec must be capable of recovering from reset conditions while still maintaining regulations set by the particular country. Conventional line powered codecs return to a default condition after reset.

When a line powered codec is designed to be used in a single country, that default condition can be set to correspond to that country, ensuring compliance with all regulations throughout the reset process. However, if the same codec is then used in a different country, the default reset settings of the codec might not comply with the local regulations (e.g., AC and/or DC impedance requirements), the codec will likely fall out of compliance at least for the brief time after reset, and the codec reverts to its default conditions. In most countries this is unacceptable.

Thus, line powered codecs have conventionally been designed to comply with the regulations of a single country. To market a line powered codec in more than one country, a manufacturer would have to design and stock a corresponding number of models of their line powered codec. Unfortunately, multiple models of a product increase costs and cause products utilizing the line powered codecs to be inflexible between countries.

The disclosed line powered codecs overcome the issues associated with line powering a codec capable of configuration for any of a plurality of countries.

In particular, the disclosed line powered codec overcomes at least the following issues otherwise problematic with conventional line powered modems: (a) Maintaining customized country-specific register settings (e.g., setting AC impedance values) through a power down of the line powered portion of the line powered codec. (b) Retaining an off-hook condition throughout power down cycles of a line powered codec by maintaining register contents throughout a call bridge; (c) Preventing oscillation in the telephone line caused by repeated shutdown and power-up of a line powered codec due to a low current condition insufficient to fully power the line powered codec; and (d) Distributing available current draw among the line powered components of a codec through on-hook to off-hook transitions, or off-hook to on-hook transitions in light of the greatly different amount of available line current during on-hook or off-hook conditions.

An exemplary startup procedure for an international line powered codec is disclosed using certain register settings, e.g., country-specific register settings, which are powered and maintained from the low voltage side (e.g., from the PC or modem side) of the line powered codec. By powering appropriate registers from the low current draw side (i.e., "low voltage side") of the line powered codec, the programmed state of the line powered codec can be maintained even through a call bridge where the telephone line looses power for up to 400 milliseconds (mS).

A call bridge is a temporary interruption in the line current from the central office to the premises telephone, and can last as long as 400 mS. Telephone regulations specify that the telephone must recover to an off-hook current draw within 15 mS of the central office restoring power to the telephone line.

By maintaining power to registers, a default condition is not necessarily returned to by the line powered codec upon reset due to a power loss in the telephone line.

Interface codecs are used in digital data access, arrangements (DAAs) to provide, among other things, digital-to-analog and analog-to-digital conversion between the analog signals on a telephone line and the digital components such as a processor (e.g., digital signal processor (DSP)) in a modem or other application device utilizing the DAA.

In order to meet international standards, terminal equipment (modem) must seize the line and set the appropriate current according to the country specific voltage/current (VI) loadline. This must be accomplished within 20 milliseconds (mS) to satisfy the requirements of most countries. To set the current this fast the gyrator which sets the DC current and voltage must be pre-charged. This is typically accomplished with several external components which form various pre-charge filters and an electronic inductor.

In addition the line powered codec should not be turned on if the line current is too low to support operation.

Conventional modem codecs address such problems by using external components which can be switched in and out based on the requirements of the specific country. Unfortunately, the external components needed for this method of hardware programmability increases costs tremendously.

In contrast, the present invention provides a codec in a digital data access arrangement (DAA) which is capable of retaining programmed settings even through a reset condition, without the need to change or switch external components in or out.

FIG. 1 shows a simplified example system topology for a line powered codec with extended DC feedback control in accordance with the principles of the present invention. Details such as a full-wave rectifier (i.e., polarity guard), lightning protection circuits, and other details are not shown in FIG. 1 for simplicity of explanation.

In particular, in FIG. 1, a line powered codec 100 in accordance with the principles of the present invention provides the basis for a DAA between a digital signal processor (DSP) 102 of, e.g., a modem and a telephone line from a central office 140.

In the disclosed embodiment there are two circuits in parallel with one another on the line side of the adaptive line powered codec 100, across the Tip and Ring connections to the telephone line from the central office 140. The central office 140 provides an amount of line current through a characteristic impedance on the telephone line as depicted by the series connection of a voltage source 132 (e.g., 50 volts) and a resistor (e.g., 600 ohms).

The first parallel circuit on the line side of the line powered codec 100 comprises a series connection of a current source 120, a shunt resistor 122, a transistor 124, and a resistor 126. The current source 120, shunt resistor 122, and transistor 124 provide a programmable impedance technique. The impedance of the customer premises equipment including the line powered codec 100 is controlled by the line powered codec 100 in accordance with the values of appropriate registers set by the DSP 102. The resistor 126 allows a current in this first parallel circuit to be measured.

In accordance with the principles of the present invention, a second parallel circuit on the line side of the line powered codec 100 includes a reference capacitor 130 (Cref) in series with a reference resistor 128 (Rref). Cref and Rref set a reference impedance level.

The line powered codec 100 includes an analog-to-digital (A/D) converter 106 in a receive path, and a digital-to-analog (D/A) converter 110 in a transmit path. In addition, a default current level control module 108 is added to a transmit path at a summation point to depict control of the level of current being drawn from the telephone line. The default current level may be, e.g., 10 mA.

A DC current module 114 sets the level of DC current generated on the telephone line by the current source 120.

A shunt control module 116 generates a voltage sufficient to operate the codec.

A DC current measurement module 118 allows measurement of the current and voltage of the available power on the telephone line.

A current good module 112 determines if the amount of current measured by the DC current measurement module 118 is sufficient to allow line powered operation of the line powered components of the codec 100.

Figure 2:
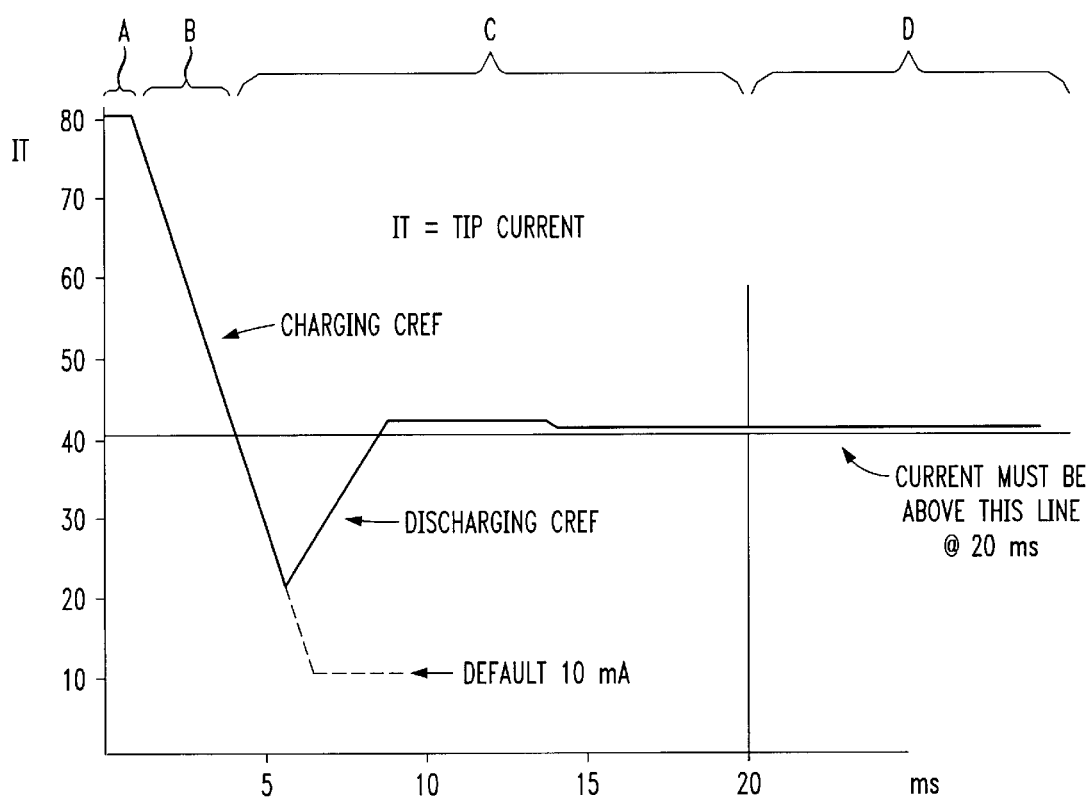
FIG. 2 shows the resulting line current after the system of FIG. 1 is placed off-hook, in accordance with the principles of the present invention.

FIG. 2 shows the resulting line current after the system of FIG. 1 is placed off-hook. In FIG. 2, the x-axis shows time (in milliseconds (ms)) and the y-axis shows the tip current in milliamps (mA).

FIG. 3 shows the resulting line voltage after the system of FIG. 1 goes off-hook. In FIG. 3, the x-axis shows time (ms) while the y-axis shows tip voltage (volts).

The startup procedure of the line powered codec 100 is best described with respect to its operation through four states after the line powered codec 100 goes into an off-hook condition and seizes the telephone line. The four states are arbitrarily referred to herein as State A, State B, State C, and State D, and are shown in each of FIGS. 1, 2 and 3.

The first state (e.g., State A) relates to the initial moment after the telephone line goes off-hook and during which the line powered codec remains in a reset condition. The second state (e.g., State B) relates to the time of instability of certain line powered components in the codec 100 and during which a capacitor draws an initial surge of current. The third state (e.g., State C) relates to the point at which the line powered components of the line powered codec 100 become stable and the rechargeable element provides current back to the line powered components of the line powered codec 100. The line powered codec 100 becomes stable after the third state (State C) is completed (e.g., forming what may be referred to as a fourth State D). State D refers to the final state indicating the end of the startup procedure.

The operation of States A to C are now discussed in more detail, with reference to FIGS. 1, 2 and 3.

State A: (e.g., 0 to 1 ms)

Initially, the modem (including the DSP 102) causes the line powered codec 100 to go off-hook and start drawing nearly short circuit line current. In this condition (i.e., in State A), the majority of the components of the codec 102, i.e., the line powered components of the codec, will be in reset. This is pictorially depicted by a figurative switch to ground in element 147. Switch 147 is across the current source 120. Of course, element 147 is for explanation purposes only, and does not necessarily constitute an actual switch to ground. The intent of switch 147 is to temporarily short the current source 120 to get a large value of $I_T$ flowing at the beginning of the off-hook startup procedure.

The line powered components of the codec 102 are pre-selected such that their power draw during on-hook conditions will be less current than the maximum allowed from the telephone line in any country of use, e.g., less than 200 microamps (uA) of current from the telephone line.

During State A, the voltage at the Tip will be maintained at a minimum level, e.g., 5V, while presenting nearly a short circuit to the central office 140. In the given example, the Tip current (IT) of the codec will be, e.g., 80 mA.

In accordance with this aspect of the present invention, the DC current measurement module 118 of the codec 100 measures the Tip current (IT) to determine if the available amount of current is high enough to support operation of the line powered components of the codec 100. The current good module 112 depicts a comparator circuit or similar circuit or digital process to determine if sufficient current is being drawn from the telephone line.

If the current good module 112 determines that there is not sufficient current available, the line powered codec 100 will remain in reset, i.e., in State A. However, if the current good module 112 determines that the amount of available current being drawn from the telephone line after a given amount of time is sufficient enough to support operation of the line powered components of the codec 100, the next state (e.g., State B) is entered. In the given embodiment, sufficient current drawn from the telephone line to support line powered operation of the codec is an amount of at least 10 mA after 1 ms of measurement.

State B: (e.g., 1 ms to 6 ms)

After State A successfully determines that there is sufficient current in the telephone line to power the line powered codec 100, the codec 100 enters the second state, e.g., State B.

In State B, the initial reset state (State A) is de-asserted and normal operation of the line powered components of the codec 100 begins. This includes opening switch 147. At this point, the line current (i.e., the Tip current) is set to a suitable default value, e.g., to 10 mA as depicted by the 10 mA control module 108.

In accordance with the principles of the present invention, an impedance 128 and 130 is charged during State B, as particularly shown in FIG. 2 In the disclosed embodiment, the impedance 128, 130 is comprised of a series connection of a reference capacitor 130 (Cref) and a reference resistor 128 (Rref).

Because of the initial drain of charging the impedance 128, 130, the default current (e.g., 10 mA set by control module 108) will not be reached for a certain period of time. Thus, State B will continue for an amount of time sufficient to allow stabilization of the charge to the impedance 128, 130. The charge to the impedance 128, 130 may be considered stabilized when it reaches, e.g., 90% of its ultimate level, as depicted in FIG. 2.

For example, as shown in FIG. 2, an exemplary amount of time sufficient to allow the disclosed impedance 128, 130 to charge is 5 milliseconds (ms). This stabilization time (e.g., 5 ms) also allows the analog circuits and filters (e.g., digital signal processor (DSP) filters) in the DAA time to stabilize.

After the DAA components have been allowed to stabilize (e.g., after the 1 ms of State A and the 5 ms of State B), State C is entered.

State C: (6 mS to 20 ms)

In State C, extended DC feedback in a suitable processor supporting the codec (e.g., digital signal processor (DSP)) begins to operate. In accordance with the extended DC feedback feature of the present invention, the supporting processor (e.g., DSP 102) models a variable resistor.

To perform as a variable resistor, the DSP 102 measures the Tip voltage using the A/D converter 106. Based on the value of the Tip voltage, the DSP 102 will set the value of the Tip current by adjusting the output voltage of the digital-to-analog (D/A) converter. Thus, the DSP 102 provides extended or additional DC feedback to the telephone line ensuring that any of a variety of country's V/I loadline will be met within the desired amount of time, e.g., within 20 ms.

Thus, using the support of extended DC feedback, the Tip current (IT) of the telephone line will converge to a value greater than the minimum acceptable line current for the specific country. Ideally, this convergence will happen as fast as possible without causing instabilities.

Although a minimum of 20 ms is described as satisfying the regulations of most countries of current interest, the specific line current and convergence time are preferably programmably controlled by software parameters in the DSP, allowing use of the line powered codec 100 in many countries.

State D: (20 ms to Call Duration)

After State C, (i.e., during a subsequent State D), the parameters of the system will have been met. Preferably, the DC loadline will be protected from disturbances by AC signals. To this end, the DSP is capable of adjusting the DC feedback so that the system appears to the telephone line as a large inductor.

In other words the feedback transfer function of the line powered codec 100 of the DAA functions as a low pass filter having a cutoff frequency as close to DC as possible. This is because fast changes in the DC value are no longer necessary. A suitable description of how a digital signal processor (DSP) can be operated to emulate a large inductor is provided in U.S. application Ser. No. 09/310,021, filed May 11, 1999, entitled "Digital Gyrator", by J. Fischer, D. Laturell, and L. Smith, the entirety of which is expressly incorporated herein by reference.

In addition to the issues surrounding the proper power-up of a line powered codec as described herein above, a line powered codec is disclosed which is capable of retaining an off-hook condition during a call bridge even through an unexpected power-down of the line powered codec due to a low current or low voltage condition on the supplying telephone line. These and other aspects of the present invention allow a line powered codec to operate and pass homologation testing on low current telephone lines.

Many countries around the world specify that the Tip/Ring voltage can collapse to 0 volts during an active call, and that the collapsed voltage level can remain at 0 volts for up to 400 ms. Thereafter, when the otherwise normal Tip/Ring voltage level is restored, the current on the telephone line must rise to greater than a certain level, e.g., 15 mA within a prescribed amount of time, e.g., within 15 ms, to continue the previously established telephone call. Of course, while these values relate to a worst case scenario for many countries, these values are only exemplary as each particular country may have a different specification as to how long the voltage can remain at 0 volts, how fast the device (e.g., modem) must respond when the voltage is returned, etc.

To set up a telephone call, a conventional codec typically includes several programmable registers which are programmed to set gain, control startup timers and go off-hook. However, this presents a problem for a line powered codec which is placed in the high voltage section (i.e., the line side) of a modem.

For instance, when the voltage of the line (i.e., at Tip/Ring) collapses, e.g., to substantially 0 volts, a line powered codec will be caused to reset. Thereafter, when power is reapplied to the telephone line from the central office, the line powered codec will again power-up and enter its default state, i.e., an on-hook state.

This leads to a difficult synchronization problem for the controller of the modem (e.g., for the DSP) because the conventional controller has no knowledge of when the voltage of the line (i.e., Tip/Ring voltage) has been restored, and therefore may be unable to re-establish the line powered codec back into its previously off-hook state quickly enough to meet the requirements of the particular country, e.g., to 15 mA within 15 ms.

In accordance with this aspect of the present invention, a call bridge (i.e., TIP/RING voltage collapses to 0 VDC) can be maintained in a way which meets the requirements of many countries without the need for additional country-specific components to be switched in and out.

Figure 4:
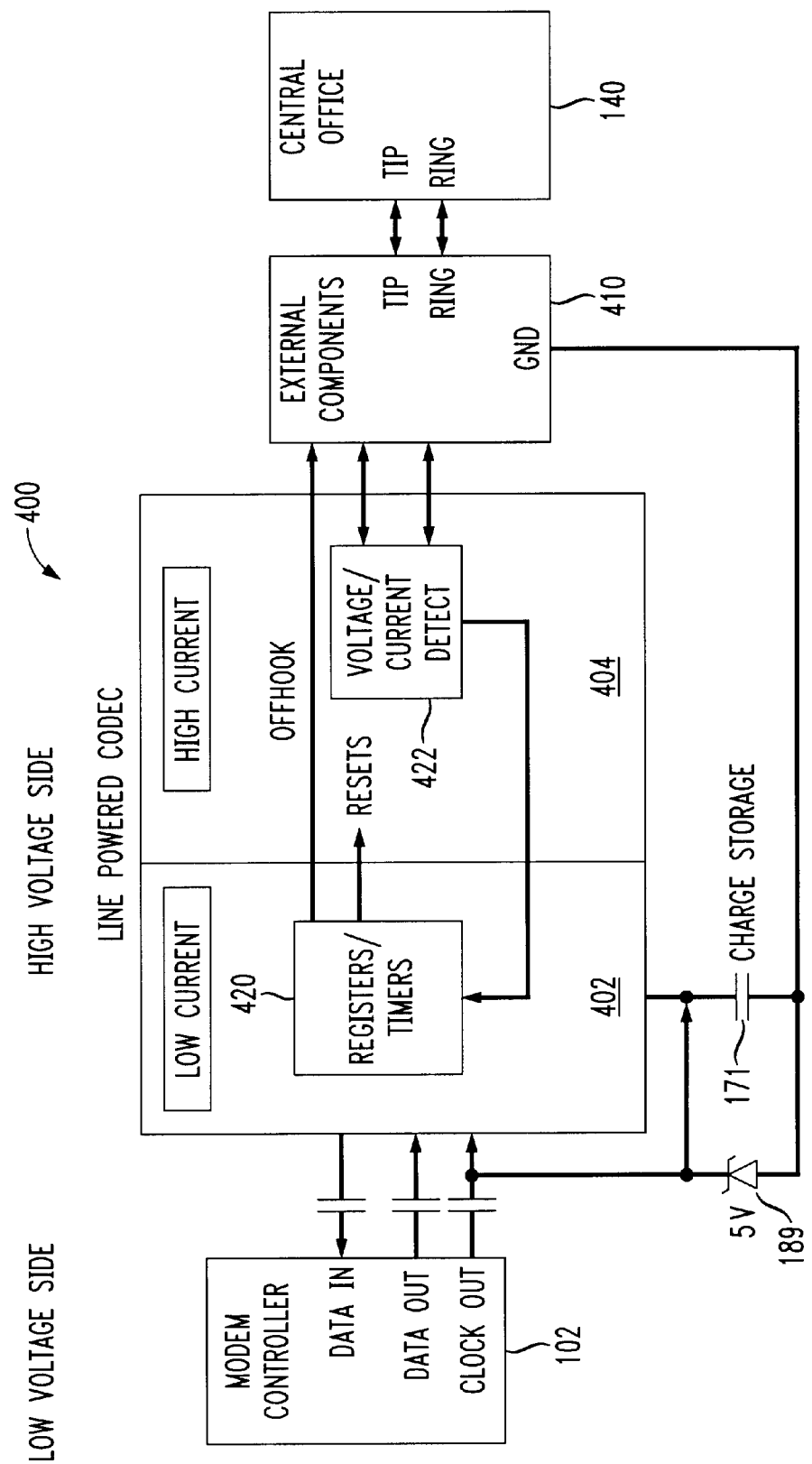
FIG. 4 shows a block diagram of a line powered codec having a low current portion and a high current portion of a line powered codec, in accordance with another aspect of the present invention.

FIG. 4 shows a block diagram of a line powered codec having a low current portion and a high current portion of a line powered codec, in accordance with another aspect of the present invention.

In particular, in FIG. 4, the line powered codec includes both a low current portion 402 and a high current portion 404. The low current portion 402 and the high current portion 404 are powered separately. The high current portion 404 is powered entirely from the power derived from the telephone line. However, importantly, the low current portion 402 obtains power from the low voltage side of the line powered codec 400 (i.e., from the modem side). Appropriate isolation may be used for signals passed between the low current portion 402 and the high current portion 404.

The high current portion 404 contains most of the circuitry of the line powered codec 400, with the exception of those registers and timers 420 which should be maintained through a reset condition of the line powered codec 400 caused during a line power-down. For simplicity, only the circuits relevant to the current disclosure are shown in the line powered codec 400 of FIG. 4. Relevant to the current discussion is a voltage and current detection circuit 422.

The registers and timers 420 are always powered from the low voltage side (i.e., the left side of FIG. 4) of the line powered codec 400, e.g., from a charge storage device 171 such as a charged capacitor and not from the telephone line. On the other hand, the components deriving power from the high current portion 404 on the high voltage side (i.e., the right side of FIG. 4) of the line powered codec 400 are always powered from the telephone line from the central office 140.

The voltage and current detection circuit 422 senses the current and voltage level in the telephone line during a reset condition of the line powered codec 400. If sufficient current and voltage are detected by the voltage and current detection circuit 422, then an activation signal is provided to the appropriate state machine logic (or appropriate processor) to allow power-up of the high current portion 404 of the line powered codec 400.

The charge storage device 171 (e.g., a charged capacitor) is charged from an appropriate source on the low voltage side of the line powered codec 400. In the disclosed embodiment, the clock out (e.g., a differential clock out signal) is used with appropriate diodes to form a charge pump to charge the charge storage 171 device when the clock signal is active.

In operation, the line powered codec 400 is placed in an off-hook condition, e.g., when the modem controller 102 writes a particular off-hook control bit to an appropriate register 420 in the low current portion 402 of the line powered codec 400. At this point an external switch hook (in 410) is closed and current flows into the line powered codec from the telephone line.

The voltage/current detection module 422 inside the high current portion 404 of the line powered codec 400 monitors the voltage and current of the line (i.e., the Tip/Ring voltage and current). If both voltage and current are high enough for the components in the high current portion 404 of the line powered codec 400 to operate, an appropriate signal is sent to the low current portion 402 of the line powered codec 400 causing an activation of a startup timer sequence based on the timers 420 in the low current portion 402.

After the line powered codec 400 is up and running, various country regulations allow for the voltage and/or current on the telephone line from the central office 140 to be interrupted. In this case, if the voltage and/or current from the central office 140 are interrupted, the voltage and current detect circuit 422 will trip and activate the startup sequencer based on the timers 420 in the low current portion 402, which in turn will activate the analog and other circuitry in the high current portion 404. During this interruption of power, data transmitted to the modem controller 102 will enter a reset condition, e.g., become all zeroes.

In this reset condition, the digital circuitry in the low current portion 402 of the line powered codec 400 will draw very minimal current. In accordance with this aspect of the present invention, current necessary to maintain the registers in the low current portion 402 of the line powered codec 400 will be supplied from the low voltage side of the line powered codec 400 for the necessary amount of time, e.g., for up to 400 ms.

The modem controller 102 supplies the necessary power using, e.g., charge pumping from, e.g., a clock signal or other oscillating signal and an external capacitor. The charge pump allows a much smaller and more practical charge storage capacitor 171 to be used to power the low current side 402 during the call bridge. A suitable description of an exemplary charge pump is provided in U.S. application Ser. No. 09/192,651, filed Nov. 16, 1998, entitled "Combination Clock And Charge Pump For Line Powered DAA", by T. E. Fuehrer, K. E. Hollenbach, D. Laturell, and S. B. Witmer.

At this point, all registers 420 in the low current portion 402 of the line powered codec 400 retain their previously maintained values which they were programmed to from their default values, including, e.g., a bit or bits setting an off-hook condition which established a call bridge at the time that line powered was interrupted.

After the line power interruption and the central office voltage returns within an allowed amount of time, e.g., within 400 ms, the voltage and current detect circuit 422 will output an appropriate activation signal, e.g., from low to high, to the state machine logic, and the original startup sequence will repeat based on the maintained timers and registers 420 but with the recognition that although the high current drawing circuitry will be in reset due to the power loss, the activation of the startup sequence does not reset the devices powered off the low voltage side of the line powered codec 100, e.g., the register or timer values in the registers and timers 420 on the low current portion 102 of the line powered codec. By leaving the registers in place without being reset during a power cycle of the high voltage side of the line powered codec 100, call status (e.g., an off-hook condition) can be maintained.

After TIP/RING power has been restored, the line powered codec 400 can immediately again draw at least the minimum amount of current, e.g., at least 15 mA within, e.g., 15 ms without requiring interaction from the modem controller 102. If interaction were to be required from the modem controller 102, the required speed to re-establishment of the current draw (i.e., the 15 mA) would be seriously jeopardized.

Figure 5:
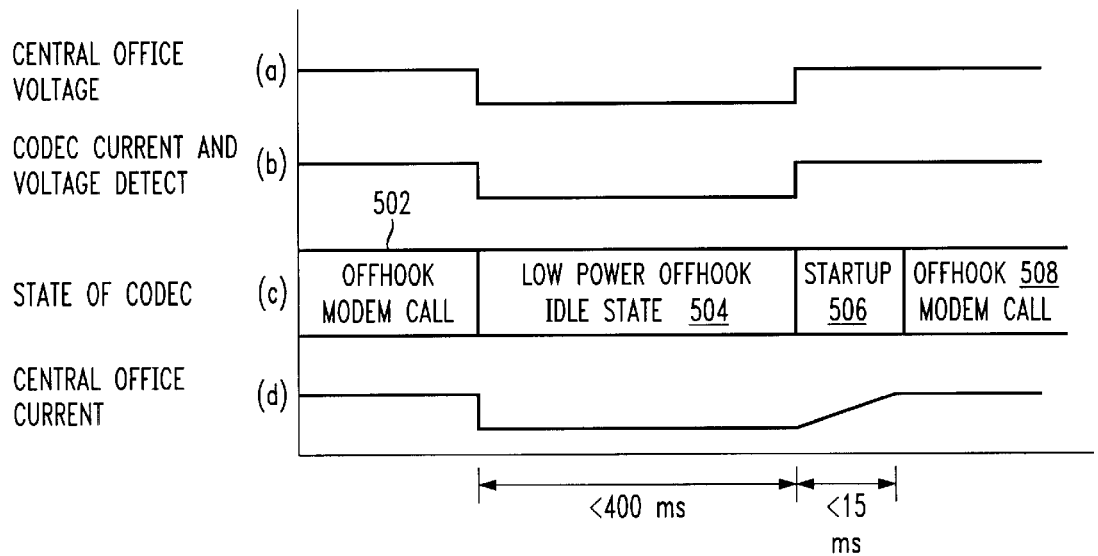
FIG. 5 shows a timing diagram useful for explaining the operation of the line powered codec as shown in FIG. 4 during a call bridge or other interruption of TIP/RING current during an off-hook condition.
Figure 6:
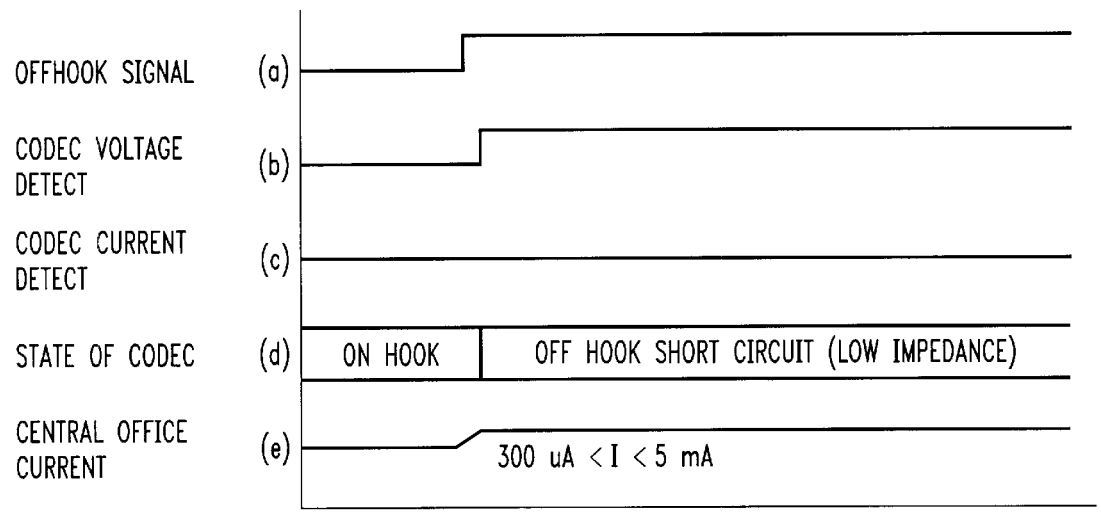
FIG. 6 shows a timing diagram useful for explaining the low current startup timing of the line powered codec in accordance with the principles of the present invention.

FIG. 5 shows a timing diagram useful for explaining the operation of the line powered codec as shown in FIG. 4 during a call bridge or other interruption of TIP/RING current during an off-hook condition.

In particular, in the example of FIG. 5, the voltage from the central office 140 collapses for a period of less than 400 mS, as shown in waveform (a). Waveform (b) shows the activation signal output from the voltage and current detect circuit 422. Waveform (c) and (d) show that a call had been established before the voltage interruption in portion 502, and shows that the components powered in the high current portion 404 of the line powered codec 400 will enter a low power off-hook idle state 504 wherein the high current components will be held in a reset condition. At this point, the voltage/current detect circuit 422 will snoop the telephone line to detect either an incoming ring signal and/or when sufficient voltage is returned to the telephone line.

After the voltage level returns from the central office 140, a startup sequence 506 is initiated in response to the activation signal as shown in waveform (b) based on the timer values and register values maintained in the registers/timers 420 in the low current portion 402 of the line powered codec 400. Then, very quickly before the maximum allotted time, e.g., 15 mS, the off-hook condition of the components in the high current portion 404 of the line powered codec 400 again draw the required current from the telephone line and continue operation as if the interruption hadn't occurred as shown in waveform (d) of FIG. 5.

The line powered codec 400 will of course power-up and begin operation when there is sufficient current on the telephone line allowing the line powered codec 100 to do so. However, the line powered codec 100 must not power up during low current conditions to avoid power draw oscillations on the telephone line otherwise caused by a repeated power-up and power-down of a conventional line powered codec due to an insufficient amount of power available on the telephone line from the central office 140. In accordance with the principles of an aspect of the present invention, the disclosed line powered codec 100 determines before it draws full current (e.g., 7 mA) from the telephone line whether or not there is enough current available to do so.

Many countries around the world specify that the Tip/Ring current can be anywhere from 300 uA to 5 ma during an off-hook condition. This current is generally too low to support a modem call using current modem circuitry.

For instance, shows the relationship of the central office current in waveform (e) with respect to the off-hook signal in waveform (a), the voltage detection signal in waveform (b), the current detection signal in waveform (c), and the on-hook/off-hook status of the line powered codec 100. The codec current detect remains low indicating there is insufficient line current for proper modem operation, and the codec high current section 404 is kept in reset.

The relevant governing body specifies regulations that the impedance looking into the modem must be low enough to appear as a short circuit during these low current connections for several hundred ms. The regulations also require that the voltage at the line (i.e., the Tip/Ring voltage) does not oscillate. Conventional line powered codecs may oscillate if powered from the telephone line, in violation of such regulations.

For instance, since the active circuitry on a typical modem will draw more than 5 ma, simply turning the modem ON will cause the line voltage at the Tip to collapse, causing the active circuitry of the modem to turn OFF. Once the active circuitry turns off, the voltage will rise again. Then, when the line voltage again becomes high enough to turn the modem circuitry back ON, this start process would repeat and appear as an oscillation, violating the governing regulations.

A conventional solution to the oscillation problem is to place all circuits which draw significant current on the low voltage side of the modem (i.e., on the PC powered side). Unfortunately, this conventional solution requires additional components and additional high voltage to low voltage isolation devices which would otherwise not be required if the components could be powered from the line. These additional components and isolation devices result in a more expensive and potentially less reliable device than if the device were powered from the line.

Figure 7:
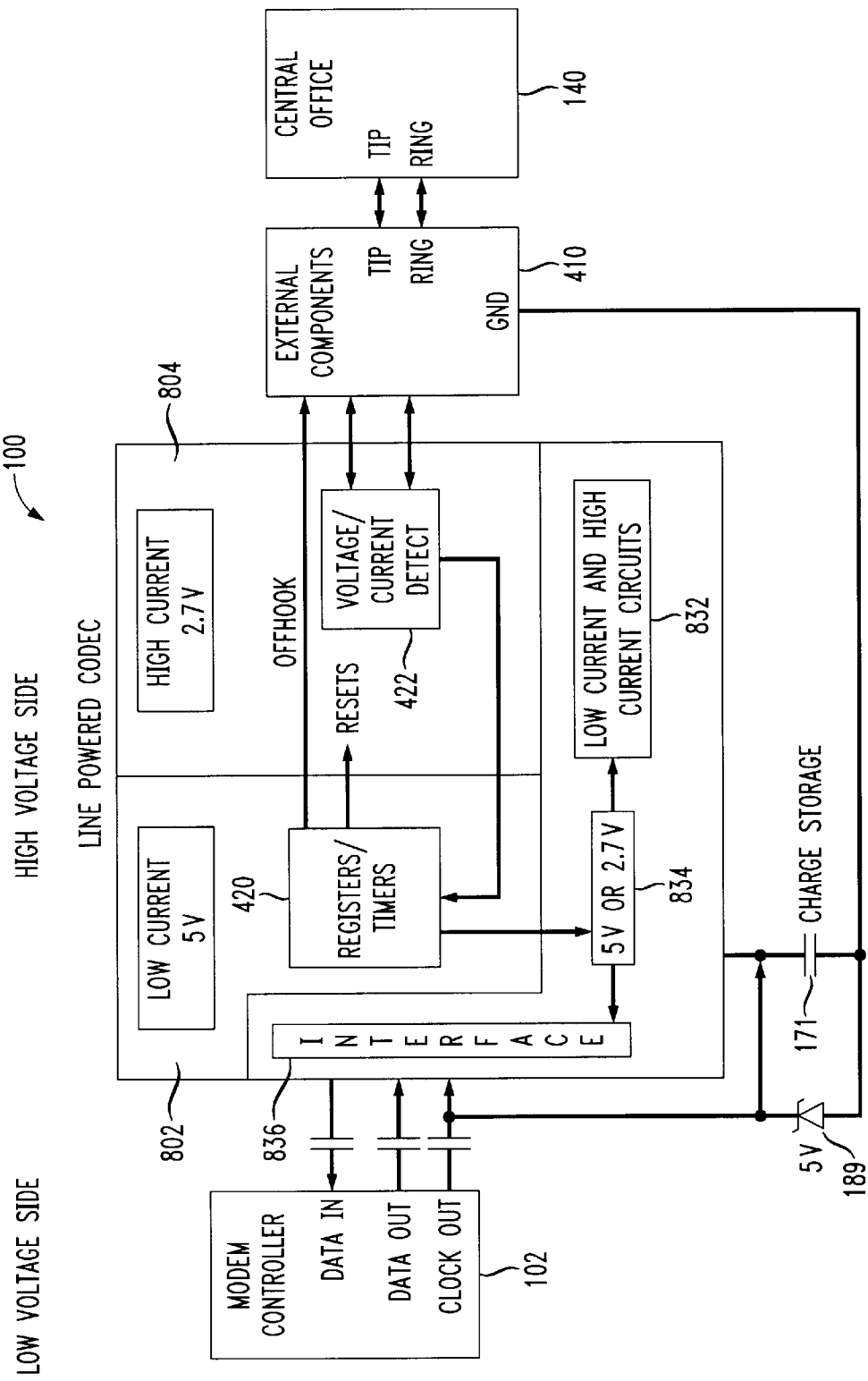
FIG. 7 shows a block diagram of another modem in accordance with yet another aspect of the present invention.

In accordance with the principles of the present invention, as shown in FIG. 7, individual components or circuits inside the line powered codec 100 may be set to draw power either from a power bus drawing power from the telephone line on the high current portion 804, or to a power bus drawing power from the low voltage side, e.g., from the modem controller 102.

In particular, as shown in FIG. 7, a line powered codec 100 includes circuits which always draw power from the low voltage side of the line powered codec 100, e.g., the registers and timers 420, and circuits which always draw power from the high voltage side (i.e., the telephone line side) of the line powered codec 100, e.g., the voltage/current detection circuit 422. Other circuits 832 which are otherwise powered by the telephone line are switched between being powered from the telephone line (e.g., using a 2.7 volt power rail derived from the telephone line) or from the modem controller 102 (e.g., using a 5 volt power rail supplied from the modem controller 102). This switching is depicted in the switch 834 shown in FIG. 7. As shown in FIG. 7 (and in FIG. 4), a Zener diode 189 may be used across the charge storage device 171 to limit the voltage level of the charge storage device 171.

At the beginning of the off-hook startup procedure, the line powered codec 100 causes the external components 410 to draw as much current as possible from the central office (i.e., resulting in as close a short circuit as possible), while at the same time powering only those devices on the power rail in the high current portion 804 of the line powered codec 100. For instance, the voltage/current detect circuit 422 remains powered from the telephone line. Preferably, at this time, only modules which draw low current are turned on in the line powered codec 100, allowing the majority of the available current to bypass the line powered codec 100 and be measured by the voltage/current detect circuit 422.

The current which bypasses the line powered codec 100 is monitored by the current detect portion of the voltage/current detect circuitry 422. If the monitored current is too low to turn on and operate the line powered codec 100, the output of the current detect circuit 422 will remain inactive (low) and the device will remain in this low line impedance state until instructed by controller 102 to terminate the call attempt and go back on-hook. However, if there is sufficient current and voltage detected to allow operation of the line powered codec 100 from the line, then the output of the voltage/current detect circuit 422 will activate, e.g., will go from 0 to 1 indicating that there is enough voltage to operate the line powered codec 100. The startup procedure discussed with reference to FIGS. 2 and 3 is then followed to establish the modem connection.

This sequence of sensing the telephone line current capacity allows a line powered codec which draws more than 5 milliamps (mA) current during normal operation to pass the relevant low line current stability tests.

Not only is distribution of the current draw from the telephone line important during low current conditions as just described, distribution of the current draw from the telephone line is also important during transitions from on-hook to off-hook and from off-hook to on-hook.

In operation, before going off-hook, the modem controller 102 writes particular control values to one or more registers 420 in the line powered codec 100 to set up a telephone call. This may include, e.g., setting up system gains, startup timer values, and/or initiating an off-hook sequencer based on the timers 420 in the low current portion 802 of the line powered codec 100.

To accomplish this, many circuits must be turned ON inside the line powered codec 100. For instance, a serial input/output (SIO) device, a data and clock receiver, a data transmitter, timers, etc. must be turned ON to set up a modem connection. When these circuits are turned ON, the total current draw of the combined modules may be several hundred microamps.

This may not be a problem when the modem is still in an on-hook condition because most countries allow at least 500 uA to be drawn from the central office during signaling conditions. Thus, sufficient current can be drawn by switching in, e.g., a 100K resistor across the Tip/Ring when needed. The Tip/Ring voltage is typically greater than 50 volts while in an on-hook condition. Therefore, ample current, e.g., 500 uA will be available for use in powering the codec.

However, when the codec goes into an off-hook condition, the Tip/Ring voltage may fall, e.g., to 6 volts. This would leave less than, e.g., 60 uA for use by the digital circuitry. Moreover, ring detect is performed while in an on-hook condition. All of the previously mentioned digital circuits are needed in the line powered codec 100, in addition to a bandgap, reference circuit, bias circuit and/or analog-to-digital (A/D) digital-to-analog (D/A) converters. Much of this circuitry is also needed when the modem goes into an off-hook condition.

To make the circuitry work, the circuitry would conventionally need to be duplicated and adjusted for operation in either an on-hook condition or an off-hook condition. Unfortunately, duplication of the circuitry that is needed while in on-hook and off-hook conditions would require a significant amount of area in the silicon of an integrated circuit, resulting in inefficiency. Another conventional solution would be to place as much of the circuitry as possible on the low power (e.g., PC or non-line-powered) side of the Tip/Ring interface. However, such a solution would require additional and duplicated components to work properly with the circuits on the high current telephone line powered side, significantly increasing the total cost of the system.

If at any time the voltage and/or current from the central office 140 drops (which could occur during a call bridge where the Tip/Ring voltage falls to 0 volts for up to 400 ms), the circuitry which is used to communicate with the modem controller 102 is switched using the switching mechanism 834 to draw power from a current supply from the low power side (e.g., to a 5 volt low current supply) provided by the charge storage device 171.

Thereafter, when the current from the central office 140 returns to a suitable level, the startup process is repeated. The startup process is activated by an activation signal provided by the voltage/current detect circuit 422 to the timer sequencer logic on the low current portion 802 of the line powered codec 100.

In operation, the line powered codec 100 is placed in an off-hook condition when the modem controller 102 writes an appropriate control value to an appropriate register bit or bits in the codec. At this point, an external switch hook is closed and current flows into the line powered codec 100 from the telephone line.

Relevant analog circuits (e.g., bandgap and/or bias circuits) are then switched to a power supply rail supplied by the telephone line, e.g., to a 2.7 volt power supply rail. However, at that time, preferably higher current drawing circuits, e.g., circuits which receive clock and data and transmit data, are not yet switched to be powered from the 2.7 volt power supply rail.

This is done because the current from the central office 140 may not be high enough to support the higher current drawing circuits, e.g., the analog circuits which are needed to maintain communication with the modem controller 102. Instead, the voltage/current detect circuit 422 inside the line powered codec 100 monitors the level of the voltage and the level of the available current of the line at the Tip/Ring. If both voltage and current are detected as being sufficient to power operation of the line powered codec 100, an activation signal is output from the voltage/current detect circuit 422 to the low current portion 802 of the line powered codec 100 to allow activation of the startup timer sequence. At this time, the power rails of blocks 832 and 836 are switched by 834 to be powered from the telephone line using the 2.7 volt power bus inside the codec 100.

In a particular given example, the line powered codec 100 may include four or more power rails.

Permanent power rails may be established for each of the low voltage side and high voltage side of the line powered codec 100.

For instance, a first power rail (e.g., VDDA) may be associated with high current drawing devices only necessary for operation once full power is provided by the telephone line, e.g., with an A/D converter, a D/A converter, and other high current analog and/or digital circuits. The voltage/current detect circuit 422 may also be tied to the first power rail VDDA so that it may perform its snooping operations during low power conditions from the telephone line. The first power rail VDDA may be constantly connected to draw power from the telephone line when the modem is off-hook. As an example, the first power rail VDDA may be adjusted to 2.7 volts, although other voltage levels may be implemented.

A second power rail (e.g., VDDM) may be associated with the registers and timers 420 necessary to maintain a given state of the line powered codec through a power down reset condition. The second power rail VDDM may be constantly connected to draw power from the low voltage side of the line powered codec 100, e.g., from the charge storage device 171. The second power rail VDDM may be adjusted to 5.0 volts (e.g., using a Zener diode 189), although other voltage levels may be implemented.

In addition to the permanent power rails, one or more switchable power rails may be implemented in the line powered codec 100 to allow powering of associated devices from either the low voltage side or the high voltage side of the line powered codec 100. For instance, a third power rail (e.g., VDDBG) may be switchably arranged to draw operating power either from the first power rail VDDA or from the second power rail VDDM, depending upon the available current from the telephone line. Example devices in the line powered codec 100 which may be powered from the third power rail VDDBG include, e.g., bandgap reference circuits, voltage reference circuits in general, and other relatively low current drawing devices.

Similarly, a fourth power rail (e.g., VDDAM) may be switchably arranged to draw operating power either from the first power rail VDDA or from the second power rail VDDM. The fourth power rail VDDAM may be associated with, e.g., circuits interfacing to the modem controller 102 and/or other high current devices.

In an on-hook condition, both the third power rail VDDBG and the fourth power rail VDDAM are switched or connected to the second power rail VDDM. In response to the detection of an off-hook condition, the third power rail VDDBG is switched to the first power rail VDDA. At this point, the fourth power rail VDDAM remains connected to the second power rail VDDM because the line powered codec 100 does not know at that point whether or not sufficient current and voltage can be drawn from the telephone line to sufficiently power the devices connected to the fourth power rail VDDAM. Thereafter, once the current and voltage on the telephone line are determined to fully power the line powered codec 100, the fourth power rail VDDAM is switched to the first power rail VDDA.

While the invention has been described with reference to the exemplary preferred embodiments thereof, those skilled in the art will be able to make various modifications to the described embodiments of the invention without departing from the true spirit and scope of the invention.

We claim:

1. A line powered codec comprising:
   a high current portion comprising modem components to be powered from a telephone line connected to said line powered codec;
   a first power rail in said high current portion adapted to be powered from a telephone line connected to said line powered codec;

a low current portion comprising modem components to be powered from an external power source on a low voltage side of said line powered codec;

a second power rail in said low current portion adapted to be powered from said external power source; and a third power rail switchably connectable to either said first power rail or said second power rail, said third power rail being connected to at least one modem component.

2. The line powered codec according to claim 1, wherein said external power source comprises:

a charge capacitor.

3. The line powered codec according to claim 2, wherein said external power source further comprises:

a charge pump adapted to charge said charge capacitor.

4. The line powered codec according to claim 3, wherein:

said charge pump is fed by a clock signal from said low voltage side of said line powered codec.

5. The line powered codec according to claim 3, wherein:

said charge pump comprises a plurality of diodes between a differential clock signal.

6. The line powered codec according to claim 1, wherein:

said second power rail is powered from a charge storage element external to said line powered codec.

7. The line powered codec according to claim 6, wherein:

said charge storage element is a charge capacitor.

8. The line powered codec according to claim 6, wherein:

said charge storage element is charged by a clock signal.

9. The line powered codec according to claim 8, wherein:

said clock signal is a data clock signal input to said line powered codec on a low voltage side of said line powered codec.

10. The line powered codec according to claim 1, wherein:

said first power rail is approximately 2.7 volts.

11. The line powered codec according to claim 10, wherein:

said second power rail is approximately 5 volts.

12. A method of switching a power source for at least one modem component in a line powered codec, comprising:

providing an external power source switchably connectable to said line powered codec;

detecting a level of available power from a telephone line; and if sufficient power is available from said telephone line, switching at least one modem component of said line powered codec to be powered from said telephone line, otherwise powering said at least one modem component from said external power source.

13. The method of switching a power source for at least one modem component in a line powered codec according to claim 12, further comprising:

powering a detection device used for said step of detecting from said telephone line.

14. The method of switching a power source for at least one modem component in a line powered codec according to claim 12, wherein:

said step of detecting is performed in response to an off-hook detection.

15. The method of switching a power source for at least one modem component in a line powered codec according to claim 12, wherein:

said level of power comprises detecting a level of current available from said telephone line.

16. The method of switching a power source for at least one modem component in a line powered codec according to claim 12, wherein:

said level of power comprises detecting a level of voltage available from said telephone line.

17. The method of switching a power source for at least one modem component in a line powered codec according to claim 12, wherein:

said level of power comprises detecting a level of current and voltage available from said telephone line.

18. Apparatus for switching a power source for at least one modem component in a line powered codec, comprising:

means for detecting a level of available power from a telephone line; and means for switching at least one modem component but not all components in said modem to be powered from said telephone line if sufficient power is available from said telephone line.

19. The apparatus for switching a power source for at least one modem component in a line powered codec according to claim 18, further comprising:

means for powering said detection device from said telephone line.

20. The apparatus for switching a power source for at least one modem component in a line powered codec according to claim 18, wherein:

said means for detecting is activated in response to an off-hook detection.

* * * * *